(12) United States Patent
Welch et al.

(10) Patent No.: US 10,882,170 B2
(45) Date of Patent: Jan. 5, 2021

(54) KEY LOCKING STUD INSTALLATION TOOL

(71) Applicant: United Technologies Corporation, Farmington, CT (US)

(72) Inventors: Derek T. Welch, Marlborough, CT (US); Ricky D. Tucker, Pipe Creek, TX (US)

(73) Assignee: United Technologies Corporation, Farmington, CT (US)

( * ) Notice: Subject to any disclaimer, the term of this patent is extended or adjusted under 35 U.S.C. 154(b) by 240 days.

(21) Appl. No.: 15/915,580

(22) Filed: Mar. 8, 2018

(65) Prior Publication Data

US 2019/0275652 A1    Sep. 12, 2019

(51) Int. Cl.
| | | |
|---|---|---|
| *B25B 28/00* | (2006.01) | |
| *B25D 9/06* | (2006.01) | |
| *B25B 31/00* | (2006.01) | |
| *B25B 27/00* | (2006.01) | |
| *F16B 37/12* | (2006.01) | |

(52) U.S. Cl.
CPC .......... *B25B 28/00* (2013.01); *B25B 27/0014* (2013.01); *B25B 31/00* (2013.01); *B25D 9/06* (2013.01); *F16B 37/125* (2013.01); *B25D 2222/21* (2013.01); *B25D 2250/181* (2013.01)

(58) Field of Classification Search
CPC ..... F16B 21/20; B25B 27/00; B25B 27/0007; B25B 27/026; B25B 27/04; B25B 27/143; Y10T 29/5358; Y10T 29/53678; Y10T 29/5377; B29C 65/56; B21J 15/18; B21J 15/20
USPC .................................................. 411/347, 348
See application file for complete search history.

(56) References Cited

U.S. PATENT DOCUMENTS

| | | | |
|---|---|---|---|
| 3,786,550 A * | 1/1974 | Jones | ........................ B21J 15/42 29/238 |
| 4,752,996 A | 6/1988 | Berecz et al. | |
| 6,704,985 B1 | 3/2004 | Marshall | |
| 7,153,074 B2 * | 12/2006 | Wei | ........................... F16B 5/02 411/21 |
| 2003/0219325 A1 | 11/2003 | Schultz | |
| 2016/0333919 A1 | 11/2016 | Sharp et al. | |
| 2017/0136523 A1 * | 5/2017 | Weyland | .................. B21J 15/32 |
| 2017/0203423 A1 | 7/2017 | Scholz | |

FOREIGN PATENT DOCUMENTS

EP     3498427 A1     6/2019

OTHER PUBLICATIONS

Extended European Search Report for EP Application No. 19161120.1, dated Aug. 13, 2019, 9 pages.

\* cited by examiner

*Primary Examiner* — Tyrone V Hall, Jr.
*Assistant Examiner* — Abbie E Quann
(74) *Attorney, Agent, or Firm* — Kinney & Lange, P.A.

(57) ABSTRACT

A tool for installing a stud having a plurality of locking keys into a workpiece bore includes a main body, an actuator within the main body, a nosepiece adjacent the main body and having an anvil portion, and a mandrel disposed within the nosepiece. The actuator includes a movable piston, a shaft extending axially from the piston, and a coupler on a shaft end opposite the piston. The mandrel includes a threaded head portion and a body portion, and is releasably secured to the coupler.

18 Claims, 3 Drawing Sheets

KEY LOCKING STUD INSTALLATION TOOL

BACKGROUND

Key locking studs are commonly used in aerospace and other industries to provide replaceable threaded attachment points that can be used to attach components to a workpiece. A typical key locking stud 10 (shown in FIGS. 1 and 2) includes a first threaded end 12 for threading the stud into workpiece 14. A plurality of keys 16 extend away from first threaded end 12 along a portion of stud shank 18. Distal to first threaded end 12 is second threaded end 20 to which an external component can be fastened and secured to workpiece 14.

Stud 10 can be installed into a complementary internally-threaded hole 22 in workpiece 14. An operator turns first threaded end 12 into the workpiece such that first threaded end 12 is flush or near flush with outer surface 24 of workpiece 14. Keys 16 are then driven into workpiece 14 such that they form broach slots 26 within inner threaded surface 28 of hole 22. The interfitting of keys 16 with broach slots 26 serves as an anti-rotation feature for stud 10. If hole 22 is newly formed, broach slots 26 created by keys 16 will likely be the only such slots in the hole. However, an existing hole can be reused by removing the existing stud, inserting a new stud, and angularly offsetting keys 16 from the existing slots 26 to form new broach slots 30. FIG. 3 is a plan view of hole 22, shown for simplicity without stud 10, showing existing broach slots 26, and new broach slots 30, offset from broach slots 26 by angle θ. The number of times hole 22 can be reused is limited to the number and condition of existing slots 26 and the specified angle θ.

Key locking studs are often installed using manual or pneumatic tools. Using an exemplary manual tool, the keys are driven via hammer striking force on distal ends 32 (e.g., with the tool intervening between the hammer and the keys). Prior to said driving, the operator may rotate the insert to the desired orientation. The desired orientation may be at existing, serviceable, broach slots or at a predetermined angle θ (in both directions) from unserviceable broach slots (e.g., a repair specification may specify an angle that has been calculated based on workpiece material, insert diameter, broached slot width, and the like). Manual tools, however, can damage keys due to factors such as variations in hammer striking force magnitude and direction and improper support for the workpiece, causing key deflection and improper installation.

Exemplary pneumatic tools use a mandrel to threadedly engage the exposed (second) threaded end of an uninstalled stud. The tool then automatically threads the stud into the workpiece and immediately thereafter drives the keys by pneumatic actuation. One advantage of the pneumatic tool is that the tool's exerted forces are well aligned and counteracted because the tool is secured (via the mandrel) to the stud and thus the workpiece. However, when using a pneumatic tool, the angular position of the keys about the hole cannot be controlled. As a practical matter, this limits use of the pneumatic tool to situations where no broach slots are present (e.g., at original equipment manufacture (OEM) or for a newly oversized hole).

SUMMARY

A tool for installing a stud having a plurality of locking keys into a workpiece bore includes a main body, an actuator within the main body, a nosepiece adjacent the main body and having an anvil portion, and a mandrel disposed within the nosepiece. The actuator includes a movable piston, a shaft extending axially from the piston, and a coupler on a shaft end opposite the piston. The mandrel includes a threaded head portion and a body portion, and is releasably secured to the coupler.

A method of installing a stud having a plurality of locking keys into a workpiece bore includes threading a first stud end into the bore, placing a washer over a stud shank portion, and threading a head portion of a mandrel over a second stud end. The method further includes connecting the mandrel to an actuator and actuating a tool main body to axially extend an anvil portion of a tool nosepiece toward the locking keys.

DETAILED DESCRIPTION

The present invention is directed to an actuated tool for installing a key locking stud into a workpiece. The tool includes a main body, and a removable nosepiece portion with an anvil. The tool further includes a mandrel that threads onto the stud, then attaches to a coupler within the nosepiece. When the stud is secured to the tool, a piston within the main body drives the anvil into a washer disposed axially over the stud to protect the keys as the stud is driven into the workpiece.

Figure 1:
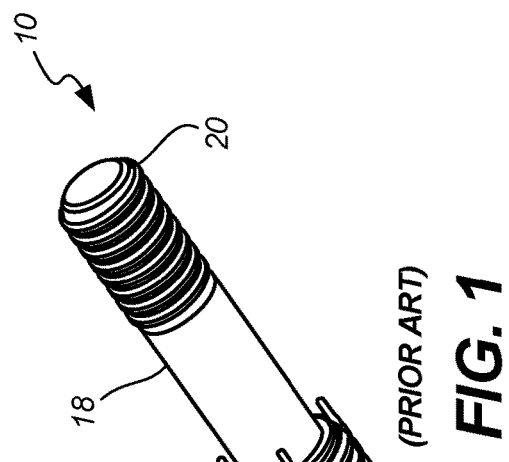
FIG. 1 is perspective view of an exemplary key locking stud.
Figure 3:
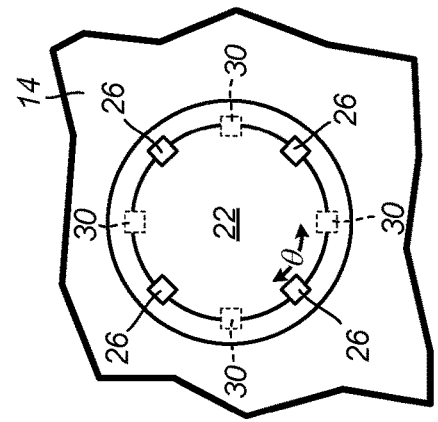
FIG. 3 is a plan view of a workpiece hole with existing and new broach slots.
Figure 2:
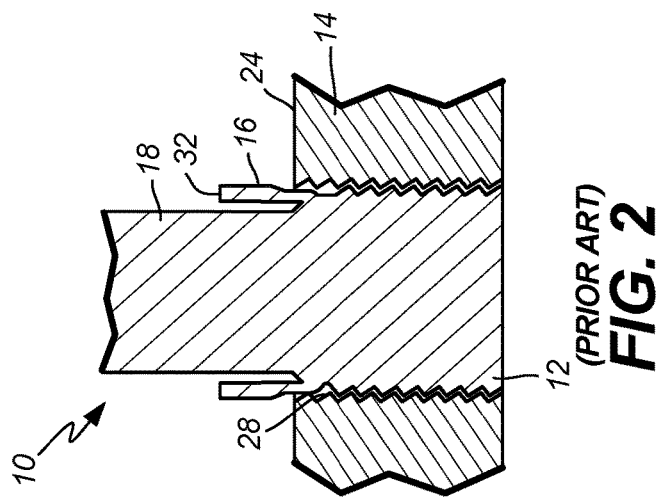
FIG. 2 is a cross-sectional view of the key locking stud partially installed in a workpiece.
Figure 4:
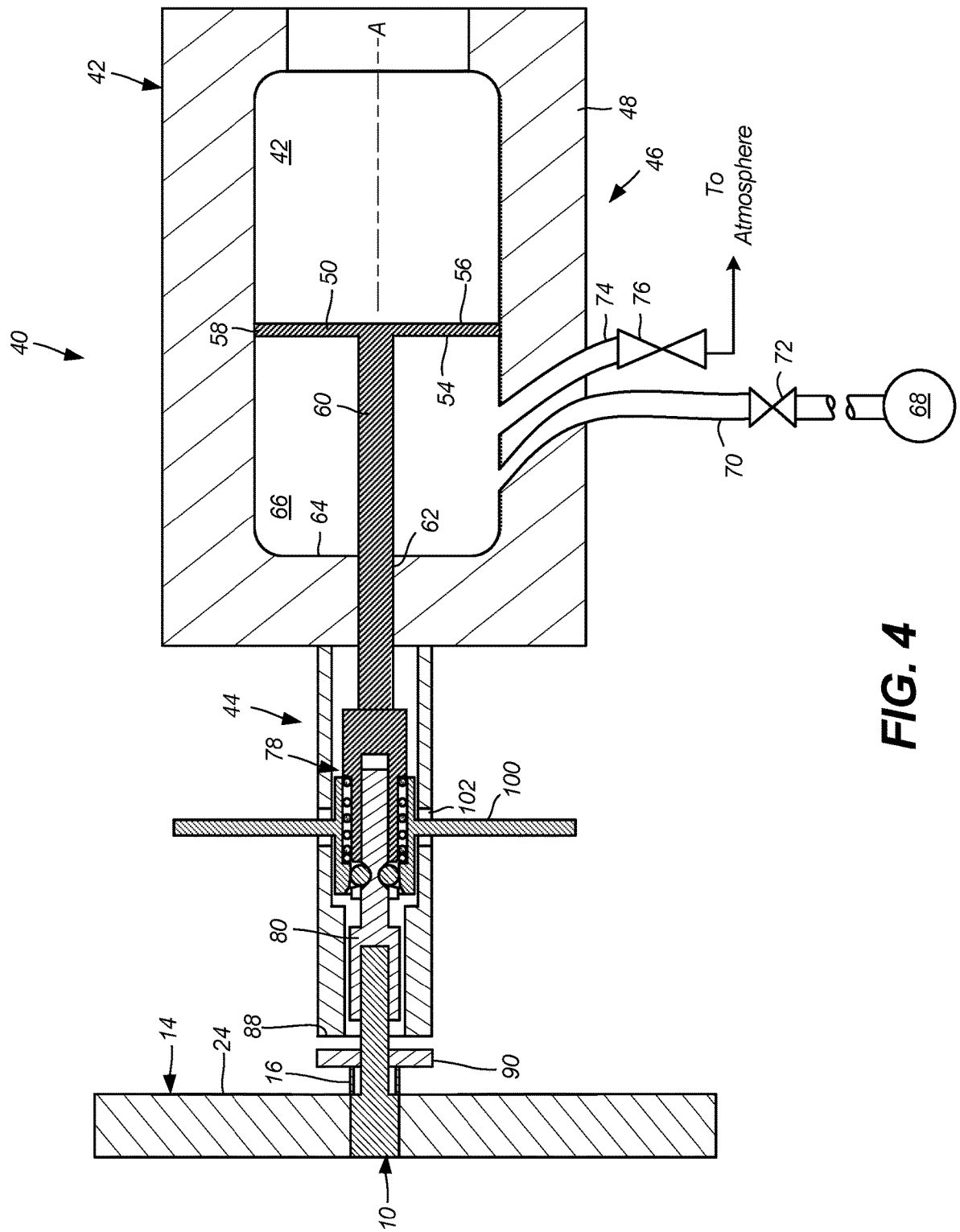
FIG. 4 is a simplified cross-sectional illustration showing a tool for installing a key locking stud into a workpiece.

FIG. 4 is a simplified illustration of installation tool 40. Tool 40 includes main body 42 and nosepiece 44 attached to main body 42. In the embodiment shown, tool 40 is a pneumatic tool having pneumatic actuator 46. Actuator 46 includes pneumatic cylinder 48 and piston 50 mounted for reciprocal motion within bore 52 of cylinder 48. Exemplary actuators include pneumatic mechanisms commonly used in pneumatic blind rivet installation tools (e.g., a commercial trigger-operated hand pneumatic rivet squeezer or similar). In other embodiments, actuator 46 can be, for example, of the hydraulic, electrical, magnetic, or thermal type. Nosepiece 44 can be, in some embodiments, releasably connected to main body 42 via threading, bayonet fitting, or other coupling mechanism. This allows tool 40 to have interchangeable nosepieces 44 of varying sizes to accommodate use with different sized key locking studs.

Piston 50 has first and second ends 54 and 56 and a lateral or OD periphery 58. Periphery 58 may bear sealing rings (not shown) to seal with the inner surface of cylinder 48. Piston shaft 60 extends axially forward (defined here as toward workpiece 14) from end 54, through central aperture 62 formed in forward wall 64 of cylinder 48. Shaft 60 can be sealingly engaged with aperture 62 such that the portion of bore 52 forward of (on the side of end 54) is a sealed space 66 into which a pressurized fluid can be introduced and withdrawn to actuate main body 42 and nosepiece 44, as is described in greater detail below. Fluid source 68 can provide a pressurized fluid (such as compressed air) to space 68 via fluid supply line 70. Supply valve 72 can be included to control to introduction of fluid into space 66. Fluid can leave space 66 via discharge line 74 via the operation of discharge valve 76. In the embodiment shown, fluid vents to the atmosphere, but can instead be returned to a reservoir in other (non-pneumatic) embodiments.

Figure 5:
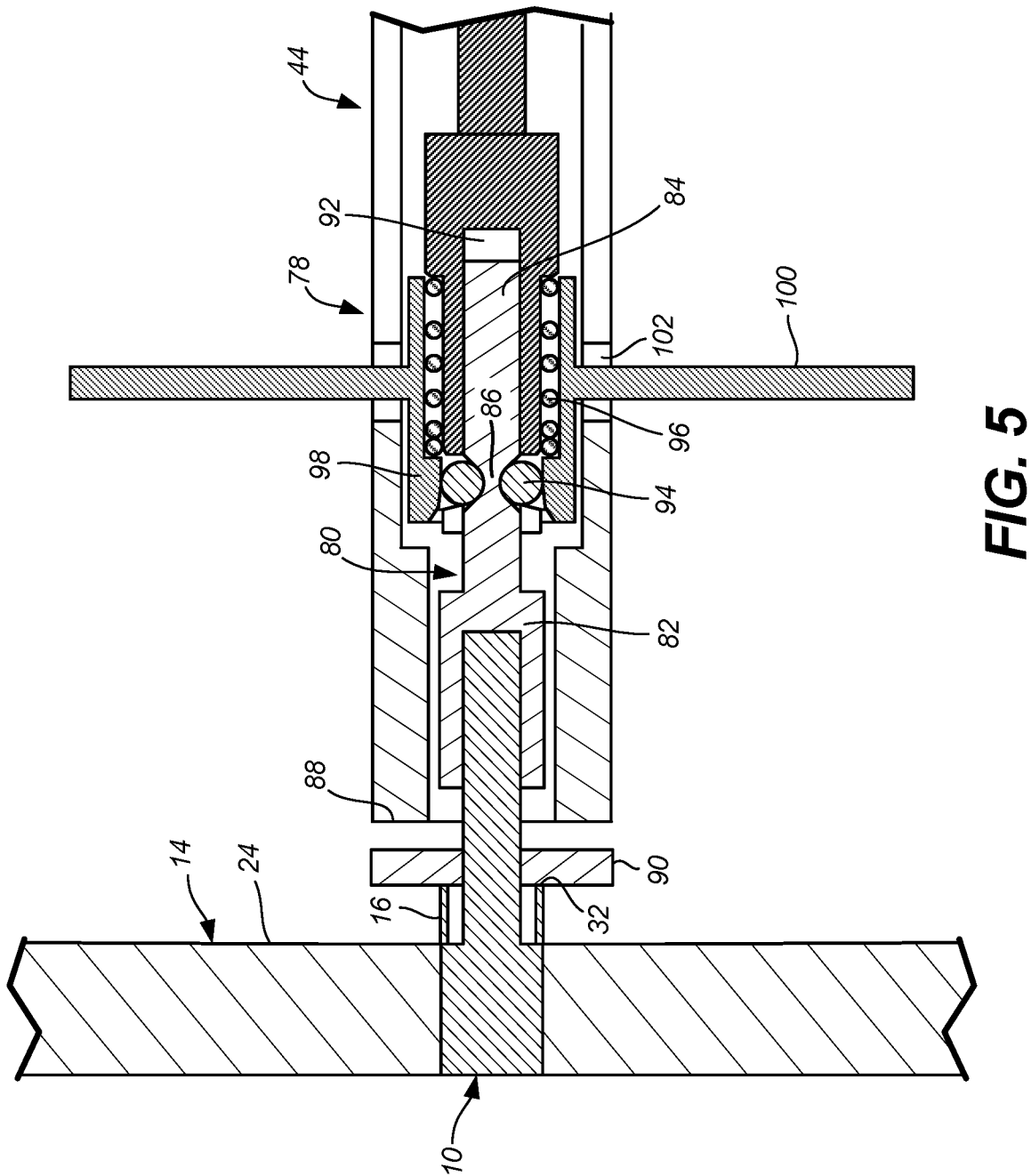
FIG. 5 is an enlarged cross-sectional view of a portion of the tool of FIG. 4.

Shaft 60 extends into cylindrical nosepiece 44 and further includes coupler 78 on a shaft end within nosepiece 44 (opposite piston 52). FIG. 5 is an enlarged view of the embodiment of FIG. 4 forward of main body 42. Coupler 78 allows piston 52 and shaft 60 to mate with mandrel 80. Mandrel 80 includes an internally threaded head 82 and an elongated body 84. Head 82 is internally threaded and is designed to thread over second end 20 of stud 10. Body 84 is smaller in diameter than head 82 in the embodiment shown, but can be equal in diameter in other embodiments. Body 84 includes annular necked-down region 86, which, as is explained in detail below, facilitates the mating of mandrel 84 with coupler 78. In the embodiment shown, mandrel 84 is a steel mandrel formed by a lathe turning process, but other metallic materials and manufacturing processes are contemplated herein.

Anvil 88 is formed on a forward end of nosepiece 44. During a stud driving operation, anvil 88 strikes washer 90, which is disposed over stud shank 18. Washer 90 is an annular structure dimensioned to evenly contact distal ends 32 of keys 16 with each strike of anvil 88. Washer 90 can be a metallic material, or any other material suitable to receive striking forces. As can be seen in FIGS. 4 and 5, anvil 88 and washer 90 have generally equivalent diameters, but either can vary depending on the dimensions of stud 10 or other factors. In some embodiments, washer 90 will not be included and anvil 88 will be appropriately sized to fully and evenly contact distal ends 32.

In operation, and with continued reference to FIGS. 4 and 5, stud 10 is manually threaded to a desired depth into workpiece 14. Stud 10 can then be clocked (angularly rotated) to place the keys in the desired position (e.g., registered with existing slots of where there are no existing slots). Washer 90 can then be placed over stud shank 18, and mandrel 80 threaded over second end 20 of stud 10. Stud 10 is secured to tool 40 through the insertion of mandrel 80 into coupler 78. Piston 50 and shaft 60 are fixed in place due to their serial connection to mandrel 80, stud 10, and workpiece 14, which are also fixed. Therefore, changes in pressure within sealed space 66 causes axial translation of main body 42 and nosepiece 44, which allows anvil 88 to drive keys 16 into workpiece 14.

In the embodiment shown, coupler 78 is a female coupler designed to receive mandrel 80 within female region 92. A plurality of locking members 94 (shown as balls) are designed to accommodate necked-down region 86 of mandrel body 84. Spring 96 surrounds a portion of female region 92, and sleeve 98 surrounds locking members 94 and spring 96. At least one lever 100 extends radially outward from sleeve 98 and through apertures 102 of nosepiece 44. To connect mandrel 80 to coupler 78, levers 100 can be pulled aftward (toward main body 42) to retract sleeve 98 to a position clear of locking members 94, such that locking members 94 can move radially outward (the unlocked state). A spring bias force returns levers 100 to a neutral position to bring coupler 78 into a locked state, as the forward movement of sleeve 98 will force locking members 94 to bear against necked-down region 86. This prevents axial movement of mandrel 80, however, mandrel 80 can freely rotate about axis A. To release mandrel 80 from coupler 78, levers 100 can again be pulled aftward to achieve the unlocked state.

With stud 10 secured to tool 40, main body 42 can be actuated to drive anvil 88 into washer 90 and keys 16. Keys 16 can be driven into workpiece 14 to a desired depth while the clocking position is maintained. At this point, mandrel 80 can be uncoupled from coupler 78/nosepiece 44 and unthreaded from stud 10.

The disclosed tool provides an efficient means of installing a key locking stud into a new workpiece hole, or one with existing broach slots. Unlike existing pneumatic tools, the disclosed tool allows for the clocking of the stud keys to any desired position. Further, and unlike existing manual tools, the disclosed tool exerts even driving forces on the keys, which can reduce the mis-driving of the keys. The disclosed tool includes interchangeable components allowing for its use with different types and sizes of studs having any number of keys. In additional to aerospace applications, the disclosed tool can be used in automotive, marine, and other transportation industries, to name a few, non-limiting examples.

Discussion of Possible Embodiments

The following are non-exclusive descriptions of possible embodiments of the present invention.

A tool for installing a stud having a plurality of locking keys into a workpiece bore includes a main body, an actuator within the main body, a nosepiece adjacent the main body and having an anvil portion, and a mandrel disposed within the nosepiece. The actuator includes a movable piston, a shaft extending axially from the piston, and a coupler on a shaft end opposite the piston. The mandrel includes a threaded head portion and a body portion, and is releasably secured to the coupler.

The tool of the preceding paragraph can optionally include, additionally and/or alternatively, any one or more of the following features, configurations and/or additional components:

In the above tool, the coupler can be a female coupler and can include a spring-biased release sleeve.

In any of the above tools, the female coupler can include a locking member.

In any of the above tools, the mandrel body portion can include a necked-down region.

In any of the above tools, a shape of the necked-down region can correspond to a shape of the locking member.

In any of the above tools, the release sleeve can have a first position allowing a radial movement of locking member and a second position blocking said movement.

In any of the above tools, the coupler further can include a lever extending through a nosepiece slot to permit an operator to move the lever to shift the release sleeve from the second position to the first position.

In any of the above tools, the mandrel can be freely rotatable about an axis of the tool when the release sleeve is in the second position.

In any of the above tools, the actuator can be a pneumatic actuator.

In any of the above tools, the nosepiece can be releasably secured to the main body.

An installation assembly includes any of the above tools, a stud threadedly engaged with the mandrel head portion, and a washer surrounding a stud shank portion.

In any of the above tools, the stud can include a plurality of locking keys.

In any of the above tools, the mandrel can secure the stud to the tool.

A method of installing a stud having a plurality of locking keys into a workpiece bore includes threading a first stud end into the bore, placing a washer over a stud shank portion, and threading a head portion of a mandrel over a second stud end. The method further includes connecting the mandrel to an actuator and actuating a tool main body to axially extend an anvil portion of a tool nosepiece toward the locking keys.

The method of the preceding paragraph can optionally include, additionally and/or alternatively, any one or more of the following features, configurations and/or additional components:

In the above method, actuating the tool main body can cause the anvil portion to contact the washer, and the washer to contact end portions of the plurality of locking keys.

In any of the above methods, actuating the tool main body can drive the plurality of locking keys into the workpiece.

In any of the above methods, the tool main body can be pneumatically actuated.

Any of the above methods can further include: clocking the stud after threading the first stud end into the bore to achieve a desired position of the locking keys.

In any of the above methods, connecting the mandrel to the actuator can include inserting a mandrel stem portion into a female coupler of the actuator.

Any of the above methods can further include: forcing a locking member against a necked-down region of the mandrel to restrict axial movement of the mandrel.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A tool for installing a stud having a plurality of locking keys into a workpiece bore, the tool comprising: a main body; an actuator within the main body, the actuator comprising: a movable piston; a shaft extending axially from the piston; and a female coupler on a shaft end opposite the piston, the female coupler comprising a spring-biased release sleeve; a nosepiece adjacent the main body and having an anvil portion; and a mandrel disposed within with the nosepiece, the mandrel comprising: a threaded head portion; and a body portion; wherein the mandrel is releasably secured to the female coupler; wherein the release sleeve has a first position allowing a radial movement of a locking member and a second position blocking said movement; and wherein the mandrel is freely rotatable about an axis of the tool when the release sleeve is in the second position.

2. The tool of claim 1, wherein the female coupler further comprises the locking member.

3. The tool of claim 2, wherein the mandrel body portion comprises a necked-down region.

4. The tool of claim 3, wherein a shape of the necked-down region corresponds to a shape of the locking member.

5. The tool of claim 1, wherein the actuator is a pneumatic actuator.

6. The tool of claim 1, wherein the nosepiece is releasably secured to the main body.

7. An installation assembly comprising:
the tool of claim 1;
a stud threadedly engaged with the mandrel head portion;
a washer surrounding a stud shank portion.

8. The assembly of claim 7, wherein the stud comprises a plurality of locking keys.

9. The assembly of claim 7, wherein the mandrel secures the stud to the tool.

10. A tool for installing a stud having a plurality of locking keys into a workpiece bore, the tool comprising: a main body; an actuator within the main body, the actuator comprising: a movable piston, a shaft extending axially from the piston; and a female coupler on a shaft end opposite the piston, the female coupler comprising a spring-biased release sleeve; a nosepiece adjacent the main body and having an anvil portion; and a mandrel disposed within with the nosepiece, the mandrel comprising: a threaded head portion; and a body portion; wherein the mandrel is releasably secured to the female coupler; wherein the release sleeve has a first position allowing a radial movement of a locking member and a second position blocking said movement; and wherein the female coupler further comprises a lever extending through a nosepiece slot to permit movement of the lever to shift the release sleeve from the second position to the first position.

11. The tool of claim 10, wherein the female coupler further comprises the locking member.

12. The tool of claim 11, wherein the mandrel body portion comprises a necked-down region.

13. The tool of claim 12, wherein a shape of the necked-down region corresponds to a shape of the locking member.

14. The tool of claim 10, wherein the actuator is a pneumatic actuator.

15. The tool of claim 10, wherein the nosepiece is releasably secured to the main body.

16. An installation assembly comprising:
the tool of claim 10;
a stud threadedly engaged with the mandrel head portion;
a washer surrounding a stud shank portion.

17. The assembly of claim 16, wherein the stud comprises a plurality of locking keys.

18. The assembly of claim 16, wherein the mandrel secures the stud to the tool.

* * * * *